United States Patent [19]
Kwon et al.

[11] Patent Number: 5,461,606
[45] Date of Patent: Oct. 24, 1995

[54] LIFT DEVICE OF LASER DISC PLAYER

[75] Inventors: Sung T. Kwon; Dong K. Yu, both of Seoul, Rep. of Korea

[73] Assignee: Goldstar Co., Ltd., Rep. of Korea

[21] Appl. No.: 174,054

[22] Filed: Dec. 28, 1993

[30] Foreign Application Priority Data

Dec. 30, 1992 [KR] Rep. of Korea ............... 26676/1992

[51] Int. Cl.⁶ ............................................. G11B 17/028
[52] U.S. Cl. ..................................... 369/258; 369/264
[58] Field of Search ................................. 369/258, 261, 369/263, 264, 195, 199, 191

[56] References Cited

U.S. PATENT DOCUMENTS 4,918,678  4/1990  Dolby ........................... 369/258
4,941,140  7/1990  Ono et al. ..................... 369/264

Primary Examiner—Stuart S. Levy
Assistant Examiner—William R. Korzuch
Attorney, Agent, or Firm—Ostrolenk, Faber, Gerb & Soffen

[57] ABSTRACT

A lift device of a laser disc player reliably maintaining a predetermined gap between an objective lens of a pick-up unit and a disc. This lift device drives its lift mechanism by rotating a plurality of cam gears using the rotational force of the existing loading motor of the disc player without addition of drive means. The lift device comprises a spindle motor mounted on a bottom center of a chassis and rotating a disc, a turntable rotatably mounted on a frame and seating the disc thereon, a pick-up unit provided with an objective lens, a rack for moving the pick-up unit in a radial direction of the disc, a loading motor generating a rotational force used for driving a plurality of cam gears, and a lift mechanism for maintaining a predetermined gap between the objective lens of the pick-up unit and the disc.

5 Claims, 4 Drawing Sheets

LIFT DEVICE OF LASER DISC PLAYER

BACKGROUND OF THE INVENTION

1. Field of the Invention

The present invention relates in general to a lift device of a laser disc player and, more particularly, to a lift device of a laser used for maintaining a predetermined gap between an objective lens of a pick-up unit and a disc.

2. Description of the Prior Art

With reference to FIG. 1, there is shown a construction of a typical lift device of a laser disc player. As shown in this drawing, the typical lift device includes a spindle motor 1 for rotating a disc D, a turntable (not shown) for seating the disc D thereon, a clamp mechanism 3 for clamping the disc D and rotating together with this disc D, and a pick-up unit 4 having an objective lens L. The lift device further includes a rack 5 for moving the pick-up unit 4 in a radial direction of the disc D, and a lift mechanism for maintaining a predetermined gap between the objective lens L of the pick-up unit 4 and the disc D. The lift mechanism is so constructed that it couples one end of the rack 5 to a hinged part 6 and drives a cam 7 provided on a lower surface of the right-side section of the rack 5, thus to adjust the height of the pick-up unit 4.

In play mode of the laser disc player, the pick-up unit 4 of the lift device moves along the rack 5. In this case, it is required to precisely maintain the predetermined gap between the objective lens L of the pick-up unit 4 and the disc D in order to correctly read the information stored in the disc D. However, the typical lift device can not reliably maintain the predetermined gap between the objective lens L and the disc D since the rack 5 has a longer length and the pick-up unit 4 has a heavy weight. There has been proposed a pick-up device (not shown) which can closely adjust the gap between the objective lens L of the pick-up unit 4 and the disc D. However, this pick-up device has a problem that it is only used in close adjustment of the gap between the lens L and the disc D, but fails in maintaining of the predetermined gap between the lens L and the disc D in the case of use of large-sized disc.

On the other hand, the typical laser disc D may be bent due to its size and this bending of the disc D causes the laser beam emitted from the objective lens L of the pick-up unit 4 to fail in its vertical incidence on the disc D. In order to overcome the problem caused by failure in vertical incidence of the laser beam on the disc D, a tilt operation is required. However, such a tilt operation is attended with variation of the distance between the disc surface and the objective lens L of the pick-up unit 4, so that the above tilt operation should be accompanied with a lift operation to compensate for the variation of distance. However, the typical lift device of the laser disc player, while carrying out the lift function, nevertheless has a problem that it achieves no precision in its operation since the relatively longer rack 5 is moved by the cam 7. Another problem of the typical lift device is that it cannot stand up well to external shock and vibration.

SUMMARY OF THE INVENTION

It is, therefore, an object of the present invention to provide a lift device of a laser disc player in which the above problems of the typical device can be overcome and which reliably maintains a predetermined gap between an objective lens of a pick-up unit and a disc.

It is another object of the present invention to provide a lift device of a laser disc player which drives its lift mechanism by rotating a plurality of cam gears using the rotational force of an existing loading motor of the disc player, thus to use no additional drive means.

In order to accomplish the above objects, a lift device of a laser disc player in accordance with a preferred embodiment of the present invention comprises a spindle motor mounted on a bottom center of a chassis and rotating a disc, a turntable rotatably mounted on a frame and seating the disc thereon, a pick-up unit provided with an objective lens, a rack for moving the pick-up unit in a radial direction of the disc, a loading motor generating a rotational force used for driving a plurality of cam gears, and a lift mechanism for maintaining a predetermined gap between the objective lens of the pick-up unit and the disc.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
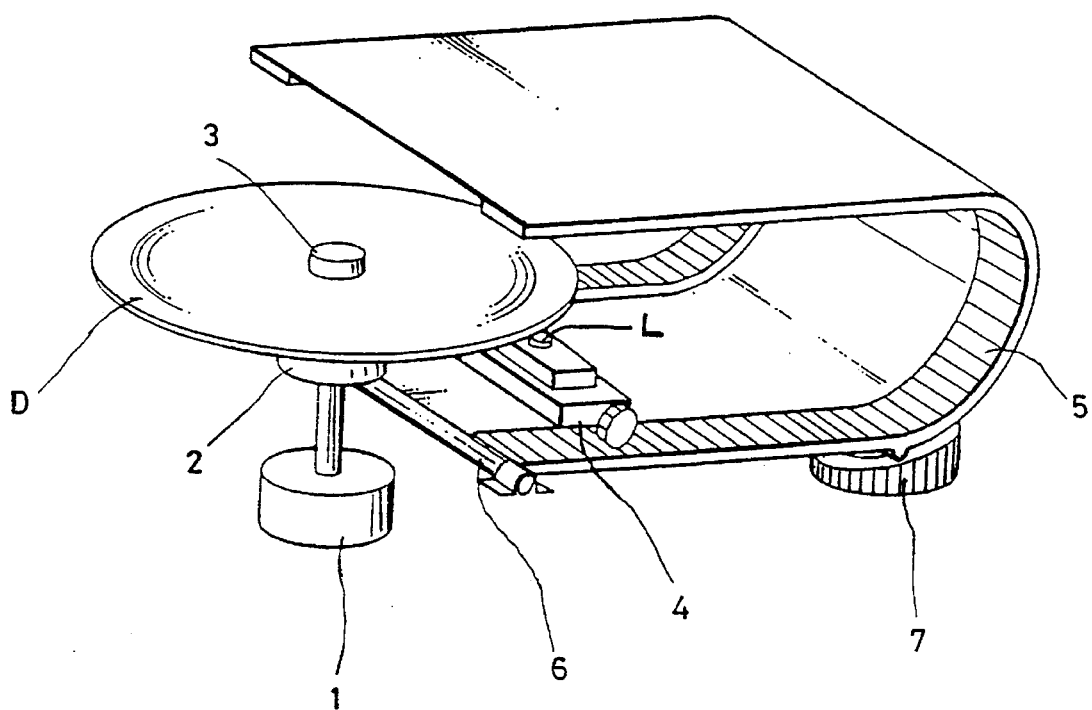
FIG. 1 is a perspective view showing a construction of a typical lift device of a laser disc player.
Figure 2:
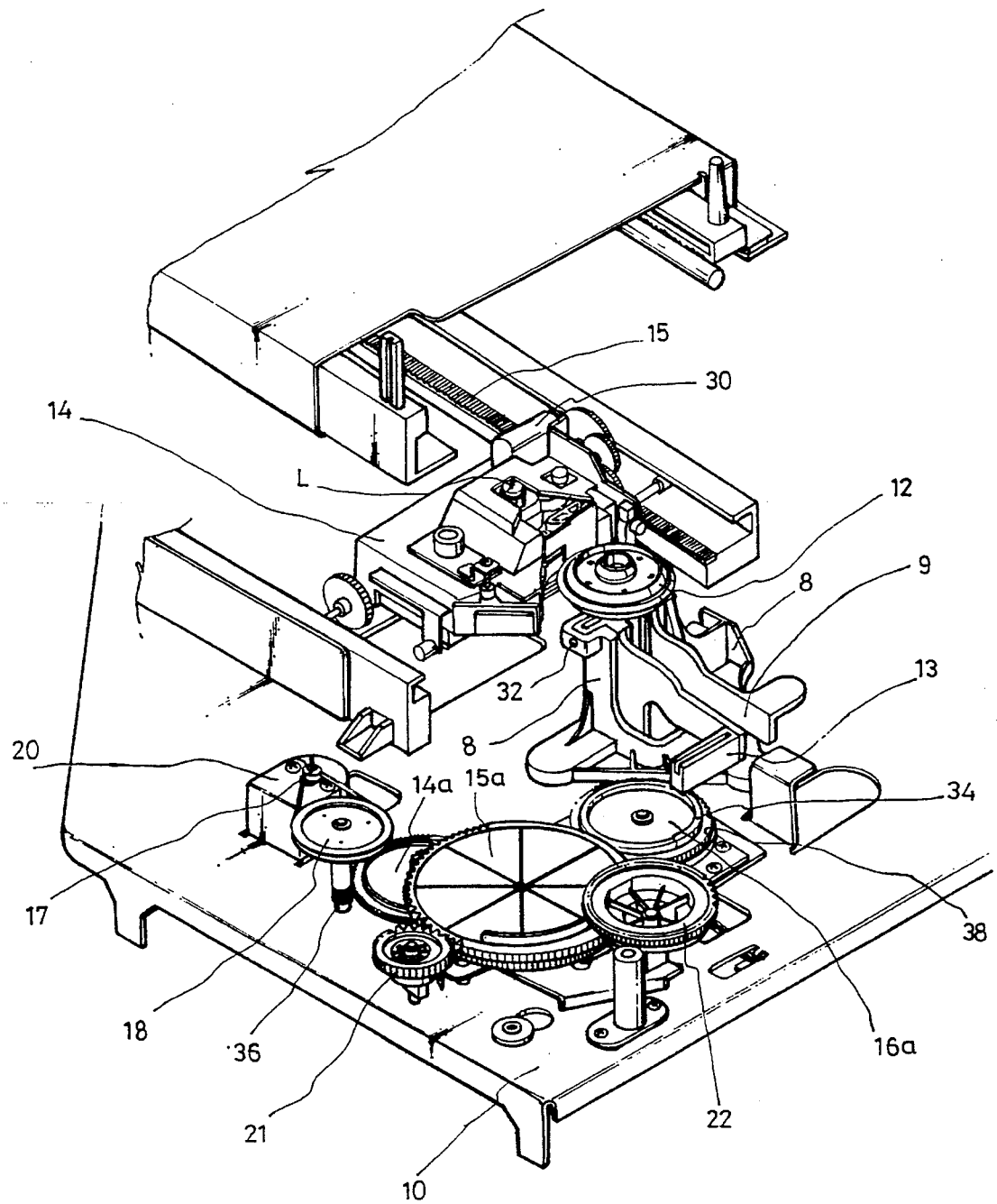
FIG. 2 is a perspective view showing a construction of a lift device of a laser disc player in accordance with a preferred embodiment of the present invention.

With reference to FIG. 2, there is shown a construction of a lift device of a laser disc player in accordance with a preferred embodiment of the present invention. The lift device of this invention comprises a spindle motor mounted on an outer bottom center of a chassis 10 for rotating a disc. Please note that this spindle motor is not shown in this drawing since it is mounted on the outer bottom of the chassis 10. The lift device also comprises a turntable 12 rotatably mounted on a holder 9 for seating the disc thereon, a pick-up unit 14 provided with an objective lens L, and a rack 15 for moving the pick-up unit 14 in a radial direction of the disc. This lift device further comprises a lift mechanism for maintaining a predetermined gap between the objective lens L of the pick-up unit 14 and the disc. This lift mechanism is driven by a plurality of cam gears, that is first to third cam gears 14a, 15a and 16a, which are driven by the rotational force of an existing loading motor 20 of the disc player. The pick-up unit 14 is so constructed that it moves upwards and downwards along the rack 15 by a rotational force of a pick-up motor 30 provided in the unit 14.

Differently from the lift mechanism of the typical lift device, the lift mechanism of this device is not integrally formed with the pick-up unit 14, but separately formed from this unit 14. That is, the lift mechanism of th is device comprises the a frame 8 fixedly mounted on the chassis 10, the holder 9 supporting the frame 8 at the inside of the frame 8 and acting as a hinged part, and a lift supporter 13 formed on a side of the holder 9. The holder 9 is coupled to a base 31 of the spindle motor 11 as shown in FIG. 3.

Figure 3:
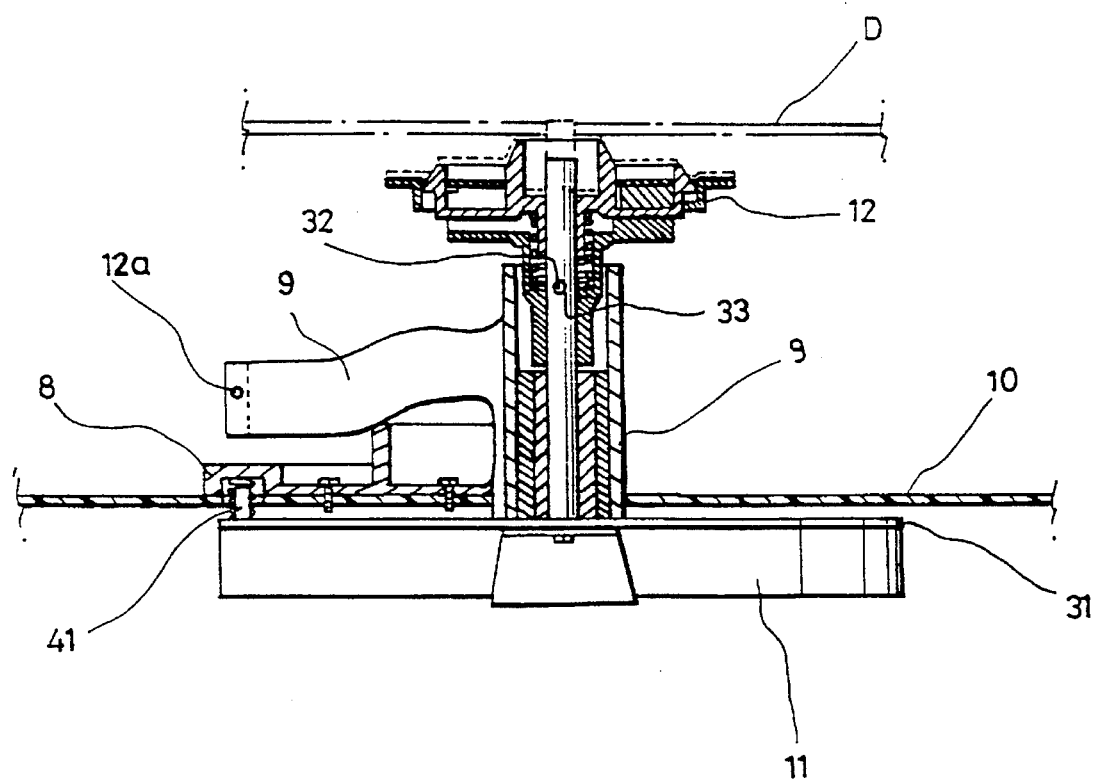
FIG. 3 is a partially enlarged sectional view of the lift device of this invention, showing a neutral state in which both sides of a disc are leveled with each other.

At the upper section of the frame 8, a hinge pin 32 is inserted into a support hole 33 formed on an upper section of the holder 9 as shown in FIG. 3. The lift supporter 13 is coupled to a side of the holder 9 by a lift pin 12a as shown in FIG. 2. This lift supporter 13 moves upwards and downwards along a gradient control surface 34 of the upper surface of the third cam gear 16a and, as a result, controls the gradients of both the spindle motor 11 and the turntable 12. In addition, the support hole 33 of the holder 9 and the hinge pin 32 inserted in this hole 33 are so constructed that they pass through the center of the spindle motor 11 and are positioned in a plane crossing the base 31 at a right angle.

In the lift device of this invention, a driven pulley 18 connected to a pulley 17 of the loading motor 20 is rotated in accordance with rotation of the loading motor 20 as shown in FIG. 2. A small gear 38 formed on the lower section of the driven pulley 18 is rotated at the same time of rotation of driven pulley 18 and this rotation of the small gear 36 causes the first cam gear 14a engaging with this small gear 36 to be rotated. At this time, since the first cam gear 14a engages with the second cam gear 15a, this second cam gear 15a is rotated at the same time of rotation of the first cam gear 14a.

In FIG. 2, the reference numeral 21 denotes a tray down gear engaging with the second cam gear 15a for moving a tray (not shown) downwards, and the numeral 22 denotes a tray horizontal moving gear for moving the tray in a horizontal direction. The vertical and horizontal moving operation of the tray is known in the art and further explanation is thus not deemed necessary.

The third cam gear 16a engaging with the second cam gear 15a is provided on its upper surface with the gradient control surface 34 which guides upward and downward movement of the lift supporter 13 coupled by the lift pin 12a. This third cam gear 14a is provided on its outside surface with a circumferential gear 38. In accordance with movement of the holder 9, the spindle motor 11 coupled to this holder 9 is moved as shown in FIG. 3, thus Co be adjusted in its gradient. As a result of such an adjustment of the gradient of the spindle motor 11, the predetermined gap between the pick-up unit 14 and the disc D seated on the turntable 12 is desirably maintained.

Figure 4:
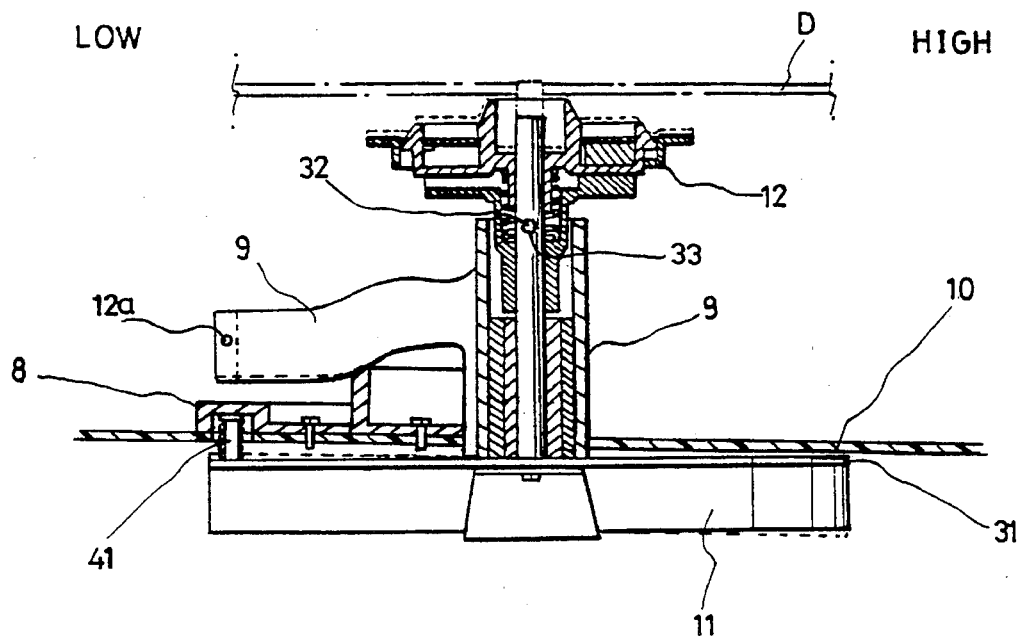
FIG. 4 is a partially enlarged sectional view of the lift device of this invention, showing a lifting state in which the left side of the disc is slightly lowered.
Figure 5:
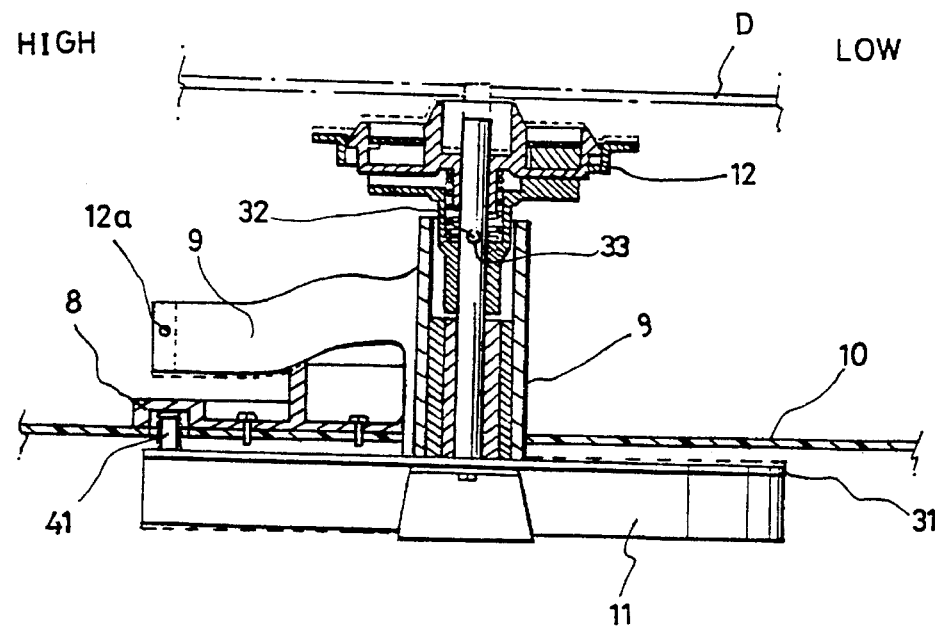
FIG. 5 is a partially enlarged sectional view of the lift device of this invention, showing a lifting state in which the right side of the disc is slightly lowered.

Turning to FIGS. 3 to 5, FIG. 3 shows a neutral state of the lift device in which the both sides of a disc are leveled with each other, FIG. 4 shows a lifting state of the lift device in which the left side of the disc is slightly lowered, thus to achieve about +10° gradient, and FIG. 5 shows a lifting state in which the right side of the disc is slightly lowered, thus to achieve about −1.3° gradient. As shown in these drawings and as described above, the lift mechanism of this lift device has the holder 9 integrally formed with the base 31 of the spindle motor 11. Hence, when the lift supporter 13 is moved along the gradient control surface 34 of the third cam gear 16a, the holder 9 is adjusted in its right-side and left-side heights by about ±1.3° in accordance with the height of the gradient control surface 34. Since the holder 9 is adjusted in its right-side and left-side heights as described above, the spindle motor 11 integrally formed with the holder 9 is adjusted in its right-side and left-side heights by the same inclination angle. Here, in order to damp the vibration of the spindle motor 11 as well as the external shock applied Co the motor 11, the spindle motor 11 is provided at a side of its base 31 with a damper spring 41. The loading motor 20 of this lift device is not driven in a play mode of the disc player, but slightly driven when the gap between the objective lens L of the pick-up unit 14 and the disc surface should be adjusted.

As described above, the lift device of this invention reduces its driving load and stands up well to both external shock and the vibration differently from the typical lift device. That is, the typical device does not stand up well to both to external shock and the vibration since this typical device moves a relatively larger rack by a hinged structure using a cam in its lifting operation. However, the lift device of this invention includes a lift mechanism and a pick-up unit, which are separately formed from each other, and moves a holder by a third cam gear using a rotational force of an existing loading motor of the disc player. Hence, this lift device adjusts the gradient of the spindle motor using no additional drive means. In this regard, this lift device reduces its driving load and well stands against the external shock and the vibration.

The lift device of the present invention is effectively used in a laser disc player (LDP), a compact disc player (CDP), a compact disc ROM (CD-ROM), an optical disc drive (ODD) for storage of information in computer and etc.

Although the preferred embodiments of the present invention have been disclosed for Illustrative purposes, those skilled in the art will appreciate that various modifications, additions and substitutions are possible, without departing from the scope and spirit of the invention as disclosed in the accompanying claims.

What is claimed is:

1. A lift device of a laser disc player having a chassis, comprising:

a spindle motor positioned at an outer bottom center of the chassis of said player, said spindle motor including a base and a rotation shaft;

a turntable for supporting a laser disc, said turntable being mounted to said rotation shaft for rotation therewith;

a pick-up unit provided with an objective lens, said pick-up unit being vertically spaced relative to said disc and being mounted for movement in a radial direction of said disc and in a parallel direction of said chassis;

a pivotably movable holder fixed to said base of said spindle motor, said holder having a lift supporter and a hinge pin and said holder supporting said rotation shaft of said spindle motor for rotation relative to said holder and for pivoting movement with said holder;

a frame fixed to said chassis, said frame including a supporting part for receiving said hinge pin to pivotably support said holder; and driving means for moving said lift supporter upwards or downwards in accordance with a variation of height of said pick-up unit relative to said disc, thereby causing said holder to pivot on said hinge pin and tilt said rotation shaft of said spindle motor such that one side of said turntable is slightly lowered or raised relative to said chassis while maintaining a predetermined vertical gap between said objective lens of the pick-up unit and said disc.

2. The lift device according to claim 1, wherein said hinge pin is inserted into a support hole formed on an upper section of said holder for pivotably supporting said holder.

3. The lift device according to claim 1, wherein said disc player includes a loading motor and said driving means includes a plurality of cam gears which are driven by the loading motor of the disc player.

4. The lift device according to claim 1, wherein a damper spring is provided at one side of said base of the spindle motor for damping an external shock applied to said motor.

5. The lift device according to claim 1, wherein said lift supporter is formed on one side of the holder.

* * * * *